United States Patent
Tachibana et al.

(10) Patent No.: US 11,898,003 B2
(45) Date of Patent: Feb. 13, 2024

(54) POLYESTER RESIN, COATING AGENT, ADHESIVE, RESIN COMPOSITION, INK, AND METHOD FOR PRODUCING POLYESTER RESIN

(71) Applicant: Mitsubishi Chemical Corporation, Tokyo (JP)

(72) Inventors: Yuka Tachibana, Tokyo (JP); Tadahiro Ozawa, Tokyo (JP); Asako Kaneko, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 163 days.

(21) Appl. No.: 17/319,324

(22) Filed: May 13, 2021

(65) Prior Publication Data

US 2021/0261726 A1  Aug. 26, 2021

Related U.S. Application Data

(63) Continuation of application No. PCT/JP2019/044113, filed on Nov. 11, 2019.

(30) Foreign Application Priority Data

Nov. 30, 2018  (JP) .................................. 2018-224336

(51) Int. Cl.

| | | |
|---|---|---|
| C08G 63/137 | (2006.01) | |
| C08G 63/127 | (2006.01) | |
| C08G 63/183 | (2006.01) | |
| C08G 63/83 | (2006.01) | |
| C08G 63/85 | (2006.01) | |
| C08G 63/87 | (2006.01) | |
| C09D 11/104 | (2014.01) | |

(52) U.S. Cl.
CPC ......... *C08G 63/137* (2013.01); *C08G 63/127* (2013.01); *C08G 63/183* (2013.01); *C08G 63/83* (2013.01); *C08G 63/85* (2013.01); *C08G 63/87* (2013.01); *C09D 11/104* (2013.01); *C08G 2150/00* (2013.01); *C08G 2170/00* (2013.01)

(58) Field of Classification Search
CPC ............ C08G 2150/00; C08G 2170/00; C08G 63/127; C08G 63/137; C08G 63/183; C08G 63/20; C08G 63/83; C08G 63/85; C08G 63/87; C09D 11/104; C09D 167/02
See application file for complete search history.

(56) References Cited

U.S. PATENT DOCUMENTS

| | | | | |
|---|---|---|---|---|
| 2007/0213501 A1* | 9/2007 | Bruchmann | ......... | C09D 167/00 528/302 |
| 2010/0160547 A1* | 6/2010 | Martinoni | .............. | C08K 3/013 264/497 |
| 2013/0323502 A1 | 12/2013 | Hashimoto | | |

FOREIGN PATENT DOCUMENTS

| | | |
|---|---|---|
| CN | 103384694 A | 11/2013 |
| CN | 104448271 A | 3/2015 |
| GB | 1 553 020 A | 9/1979 |
| JP | 53-000292 A | 1/1978 |
| JP | 2000-351837 A | 12/2000 |
| JP | 2005-250443 A | 9/2005 |
| JP | 2007-031509 A | 2/2007 |
| JP | 2008-045117 A | 2/2008 |
| JP | 2013-209564 A | 10/2013 |
| JP | 2018-150453 A | 9/2018 |
| WO | WO 2013/146347 A1 | 10/2013 |

OTHER PUBLICATIONS

Hunter L, a, b Color Scale—Technical Publication, Jun. 2008 (Year: 2008).*
Rieckmann et al. "Poly(Ethylene Terephthalate) Polymerization—Mechanism, Catalysis, Kinetics, Mass Transfer and Reactor Design", Modern polyesters, Chapter II, 2003. (Year: 2003).*
Korean Office Action dated Nov. 28, 2022 in Korean Patent Application No. 10-2021-7010903 (with English machine translation), 15 pages.
Chinese Office Action dated Jan. 20, 2023 in Chinese Patent Application No. 201980077535.X, (with English translation), 13 pages.
International Search Report dated Jan. 21, 2020 in PCT/JP2019/044113 filed on Nov. 11, 2019, 8 pages (with English Translation).
Extended European Search Report dated Nov. 24, 2021 in European Patent Application No. 19889688.8, 7 pages.
Combined Chinese Office Action and Search Report dated Jul. 27, 2022 in Patent Application No. 201980077535.X (with English machine translation), 17 pages.
Notice of Final Rejection dated May 30, 2023 in Korean Patent Application No. 10-2021-7010903 (with English machine translation), 6 pages.
Office Action dated Aug. 8, 2023, in Japanese Patent Application No. 2019-565970 (with machine translation obtained by Global Dossier).
Office Action dated Oct. 30, 2023, in Korean Patent Application No. 10-2021-7010903 (machine translation obtained by Global Dossier).

* cited by examiner

*Primary Examiner* — Frances Tischler
*Assistant Examiner* — Gennadiy Mesh
(74) *Attorney, Agent, or Firm* — Oblon, McClelland, Maier & Neustadt, L.L.P.

(57) ABSTRACT

A polyester resin has excellent adhesiveness and excellent grindability. The polyester resin includes a constitutional unit A derived from a carboxylic acid having a cyclic structure and containing 5 or more carboxyl groups, a constitutional unit derived from a dicarboxylic acid, and a constitutional unit derived from a polyhydric alcohol. The constitutional unit A has a content of 0.01 parts by mole or more and 45 parts by mole or less with respect to 100 parts by mole of the constitutional unit derived from a dicarboxylic acid. The hydroxyl value of the polyester resin is 6 mgKOH/g or more and 27 mgKOH/g or less.

9 Claims, No Drawings

POLYESTER RESIN, COATING AGENT, ADHESIVE, RESIN COMPOSITION, INK, AND METHOD FOR PRODUCING POLYESTER RESIN

TECHNICAL FIELD

The present invention relates to a polyester resin which is used in a binder for ink, a binder for toner, a coating agent, an adhesive, and the like; as well as a coating agent, an adhesive, a resin composition, an ink, and a method for producing a polyester resin.

This application is a continuation application of International Application No. PCT/JP2019/044113, filed on Nov. 11, 2019, which claims the benefit of priority of the prior Japanese Patent Application No. 2018-224336, filed on Nov. 30, 2018, the content of which is incorporated herein by reference.

BACKGROUND ART

A polyester resin is used in a molding material, a coating agent, a film, an adhesive, a binder resin for toner, a binder resin for thermal transfer film, a binder resin for ink, and the like.

For example, in order to use a polyester resin as a coating agent, a binder resin for ink, or a binder resin for toner, the polyester resin is required to have excellent solubility in a solvent. In addition, in order to use a polyester resin as a binder resin for ground toner, the polyester resin is required to have excellent grindability.

Examples of a substrate to be coated, printed, and adhesively adhered include not only paper but also molded products of resins such as polyethylene terephthalate (PET), polypropylene (PP), and polyethylene (PE). Therefore, in order to use a polyester resin as a coating agent, a binder resin for ink, a binder resin for toner, an adhesive, or the like, the polyester resin is required to have excellent adhesiveness to such a substrate.

Patent Document 1 discloses a polyester resin in which the grindability of the resin is improved by copolymerizing a trifunctional monomer.

Patent Document 2 discloses a polyester resin having a low acid value and capable of forming a resin film having excellent impact stability and good adhesiveness to a substrate.

CITATION LIST

Patent Documents

[Patent Document 1]
Japanese Unexamined Patent Application, First Publication No. 2005-250443
[Patent Document 2]
Japanese Unexamined Patent Application, First Publication No. 2007-31509

SUMMARY OF INVENTION

Technical Problem

However, the polyester resins of Patent Documents 1 and 2 have a problem that the adhesiveness and grindability thereof are not sufficient.

An object of the present invention is to provide a polyester resin having excellent adhesiveness and excellent grindability.

Solution to Problem

The present invention has the following aspects.
[1] A polyester resin including:
a constitutional unit A derived from a carboxylic acid having a cyclic structure and containing 5 or more carboxyl groups; and
a constitutional unit derived from a dicarboxylic acid,
in which the constitutional unit A has a content of 0.01 parts by mole or more and 45 parts by mole or less with respect to 100 parts by mole of the constitutional unit derived from a dicarboxylic acid.
[2] The polyester resin according to [1], in which the polyester resin has a weight average molecular weight (Mw) of 10000 or more, as measured by GPC.
[3] The polyester resin according to [1] or [2], in which the carboxylic acid having a cyclic structure and containing 5 or more carboxyl groups is at least one selected from the group consisting of benzenepentacarboxylic acid, cyclohexanehexacarboxylic acid and mellitic acid.
[4] The polyester resin according to any one of [1] to [3], in which the polyester resin has a color b value of 2 or less, as measured by spectrophotometric colorimetry.
[5] A polyester resin including:
a constitutional unit A derived from a carboxylic acid having a cyclic structure and containing 5 or more carboxyl groups; and
a constitutional unit derived from a dicarboxylic acid,
in which the polyester resin has a color b value of 2 or less, as measured by spectrophotometric colorimetry.
[6] A coating agent including:
the polyester resin according to any one of [1] to [5].
[7] An adhesive including:
the polyester resin according to any one of [1] to [5].
[8] A resin composition including:
a polyester resin containing a constitutional unit A derived from a carboxylic acid having a cyclic structure and containing 5 or more carboxyl groups and a constitutional unit derived from a dicarboxylic acid; and
a pigment.
[9] An ink including:
the resin composition according to [8].
[10] A method for producing a polyester resin, including:
polymerizing a monomer mixture containing a carboxylic acid having a cyclic structure and containing 5 or more carboxyl groups and a polyhydric alcohol in the presence of a polymerization catalyst A.
<Polymerization Catalyst A>
A compound containing a titanium atom, an alkaline earth metal atom, a phosphorus atom, and carbon atoms, in which at least a part of the carbon atoms is derived from at least one selected from an organic acid and a carboxylate.

Advantageous Effects of Invention

The polyester resin of the present invention has excellent adhesiveness and excellent grindability.

The coating agent including the polyester resin of the present invention and the adhesive including the polyester resin of the present invention have excellent adhesiveness and excellent grindability.

The resin composition of the present invention has excellent adhesiveness and excellent grindability, and the ink including the resin composition of the present invention has excellent adhesiveness and excellent grindability.

DESCRIPTION OF EMBODIMENTS

[Polyester Resin]

The polyester resin of the present invention contains a constitutional unit A derived from a carboxylic acid having a cyclic structure and containing 5 or more carboxyl groups and a constitutional unit derived from a dicarboxylic acid.

In one aspect (first aspect) of the polyester resin of the present invention, the content of the constitutional unit A with respect to 100 parts by mole of the constitutional unit derived from a dicarboxylic acid contained in the polyester resin is 0.01 parts by mole or more and 45 parts by mole or less, preferably 0.02 parts by mole or more and 10 parts by mole or less, more preferably 0.02 parts by mole or more and 5 parts by mole or less, and still more preferably 0.02 parts by mole or more and 2 parts by mole or less. In the polyester resin of the present aspect, from the viewpoint of reducing the solvent-insoluble content of the polyester resin, the amount of the constitutional unit A is preferably 0.01 parts by mole or more and 45 parts by mole or less, more preferably 0.02 parts by mole or more and 10 parts by mole or less, still more preferably 0.02 parts by mole or more and 5 parts by mole or less, and particularly preferably 0.02 parts by mole or more and 2 parts by mole or less in a case where the total amount of the dicarboxylic acid used for polymerization is 100 parts by mole.

In the polyester resin of the present aspect, from the viewpoint of grindability, the content of the constitutional unit A with respect to 100 parts by mole of the constitutional unit derived from a dicarboxylic acid contained in the polyester resin is preferably 0.15 parts by mole or more and more preferably 0.5 parts by mole or more.

Further, in another aspect (second aspect) of the polyester resin of the present invention, the color b value measured by spectrophotometric colorimetry is 2 or less. From the viewpoint of transparency of a coating film in a case of being applied onto a substrate, the color b value measured by spectrophotometric colorimetry is more preferably 0 or more and 2 or less in the polyester resin of the present aspect.

In the polyester resin of the second aspect of the present invention, the content of the constitutional unit A with respect to 100 parts by mole of the constitutional unit derived from a dicarboxylic acid contained in the polyester resin is preferably 0.01 parts by mole or more and 45 parts by mole or less and more preferably 0.02 parts by mole or more and 10 parts by mole or less. In the polyester resin of the present aspect, from the viewpoint of reducing the solvent-insoluble content of the polyester resin, the amount of the constitutional unit A is preferably 0.01 parts by mole or more and 45 parts by mole or less and more preferably 0.02 parts by mole or more and 10 parts by mole or less in a case where the total amount of the dicarboxylic acid used for polymerization is 100 parts by mole.

In the polyester resin of the present aspect, from the viewpoint of grindability, the content of the constitutional unit A with respect to 100 parts by mole of the constitutional unit derived from a dicarboxylic acid contained in the polyester resin is preferably 0.15 parts by mole or more and more preferably 0.5 parts by mole or more.

In the present invention, the grindability is improved by including the constitutional unit A in the polyester resin.

Examples of the carboxylic acid having a cyclic structure and containing 5 or more carboxyl groups include benzenepentacarboxylic acid, cyclohexanehexacarboxylic acid, and mellitic acid.

The carboxylic acid having a cyclic structure and containing 5 or more carboxyl groups may be an esterified product or an acid anhydride. These acid compounds may be used alone or in combination of two or more thereof.

For example, an aromatic dicarboxylic acid such as terephthalic acid, isophthalic acid, or furandicarboxylic acid; an aliphatic dicarboxylic acid such as phthalic acid, sebacic acid, isodecylsuccinic acid, dodecenylsuccinic acid, maleic acid, fumaric acid, or adipic acid; an acid anhydride thereof; or a lower alkyl ester thereof can be appropriately used as the dicarboxylic acid. These acid compounds may be used alone or in combination of two or more thereof.

Among these, terephthalic acid and isophthalic acid are preferable from the viewpoint of workability and cost.

Further, the polyester resin of the present invention may contain a constitutional unit derived from a trivalent or higher carboxylic acid (excluding a pentavalent or higher carboxylic acid), in addition to the constitutional unit A derived from a carboxylic acid having a cyclic structure and containing 5 or more carboxyl groups and the constitutional unit derived from a dicarboxylic acid.

Examples of the trivalent or higher carboxylic acid include trimellitic acid, trimesic acid, 1,2,4-cyclohexanetricarboxylic acid, 2,5,7-naphthalenetricarboxylic acid, 1,2,4-naphthalenetricarboxylic acid, 1,2,5-cyclohexanetricarboxylic acid, pyromellitic acid, benzene-1,2,3,4-tetracarboxylic acid, 1,4,5,8-naphthalenetetracarboxylic acid, methylcyclohexanetetracarboxylic acid, acid anhydrides thereof, and lower alkyl esters thereof. These acid compounds may be used alone or in combination of two or more thereof.

In addition, the polyester resin of the present invention contains a constitutional unit derived from a polyhydric alcohol.

Examples of the polyhydric alcohol include dihydric alcohols and trihydric or higher alcohols.

Examples of the dihydric alcohol include ethylene glycol, neopentyl glycol, 1,2-propylene glycol, butanediol, polyethylene glycol, diethylene glycol, triethylene glycol, 1,4-cyclohexanedimethanol, and bisphenol A alkylene oxide adduct.

Specific examples of the bisphenol A alkylene oxide adduct include polyoxyethylene-(2.0)-2,2-bis(4-hydroxyphenyl)propane, polyoxypropylene-(2.0)-2,2-bis(4-hydroxyphenyl)propane, polyoxypropylene-(2.3)-2,2-bis(4-hydroxyphenyl)propane, polyoxypropylene (2.2)-polyoxyethylene-(2.0)-2,2-bis(4-hydroxyphenyl)propane, polyoxypropylene (6)-2,2-bis(4-hydroxyphenyl)propane, polyoxypropylene (2.2)-2,2-bis(4-hydroxyphenyl)propane, polyoxypropylene-(2.4)-2,2-bis(4-hydroxyphenyl)propane, and polyoxypropylene (3.3)-2,2-bis(4-hydroxyphenyl)propane. The numerical values in parentheses represent the number of moles of alkylene oxide added. Above all, from the viewpoint of improving the storage stability of the polyester resin, preferred is the bisphenol A alkylene oxide adduct, among which polyoxypropylene-(2.3)-2,2-bis(4-hydroxyphenyl)propane is preferable from the viewpoint of reducing the viscosity of the slurry at room temperature.

In addition, ethylene glycol, 1,2-propylene glycol, and 1,4-cyclohexanedimethanol are preferable and ethylene glycol and 1,2-propylene glycol are particularly preferable from the viewpoint of polymerization reactivity and easy design of glass transition temperature (Tg) of the resin to 40° C. or higher.

Examples of the trihydric or higher alcohol include sorbitol, inositol, mannitol, xylitol, quercitol, maltitol, glucose, maltose, sucralose, lactose, lactitol, trehalose, isomalt, 1,2,3,6-hexatetralol, 1,4-sorbitan, erythritol, pentaerythritol, dipentaerythritol, tripentaerythritol, 1,2,4-butanetriol, 1,2,5-pentanetriol, glycerol, 2-methyl-1,2,3-propanetriol, 2-methyl-1,2,4-butanetriol, trimethylolpropane, and 1,3,5-trihydroxymethylbenzene. Among them, trimethylolpropane is preferable from the viewpoint of workability and cost.

These polyhydric alcohols may be used alone or in combination of two or more thereof.

[Physical Properties of Polyester Resin]

The polyester resin of the present invention preferably has a glass transition temperature (Tg) of 45° C. or higher and more preferably 50° C. or higher from the viewpoint of suppressing blocking of the polyester resin.

The Tg of the polyester resin was determined by measurement with a differential scanning calorimeter in accordance with JIS K7121-1987. Specifically, the polyester resin is heated at 100° C. for 10 minutes and subjected to melt quenching, then the temperature at the intersection of a baseline on the low temperature side of the chart in a case of being measured at a temperature rise rate of 5° C./min and a tangent line of an endothermic curve near Tg is obtained, and the obtained temperature is defined as Tg.

The polyester resin of the present invention preferably has a softening temperature (T4) of 100° C. to 200° C. In a case where the T4 of the polyester resin is 100° C. or higher, durability can be maintained well in a case of being used as a binder resin. In a case where the T4 of the polyester resin is 200° C. or lower, low temperature fluidity can be maintained well.

The T4 of the polyester resin is a temperature at which 4 mm of the resin in 1.0 g of the sample flows out, in a case of being measured with a nozzle of 1 mm$\varphi$×10 mm under the conditions of a load of 294 N (30 kgf) and a constant temperature rise rate of 3° C./min.

The polyester resin of the present invention preferably has an acid value (AV) of 0.1 to 100 mgKOH/g from the viewpoint of moisture resistance of the resin.

The acid value is determined as follows. Approximately 0.2 g of the measurement sample is weighed in a branched Erlenmeyer flask (A (g)) to which 10 ml of benzyl alcohol is then added, followed by heating in a heater at 230° C. for 15 minutes under a nitrogen atmosphere to dissolve the measurement sample. After allowing to cool to room temperature, 10 ml of benzyl alcohol, 20 ml of chloroform, and a few drops of a phenolphthalein solution are added thereto, followed by titration with a 0.02N KOH solution (titration amount=B (ml), titer of KOH solution=p). The blank measurement is carried out in the same manner (titration amount=C (ml)), and the acid value is calculated according to the following expression.

$$\text{Acid value (mgKOH/g)} = \{(B-C) \times 0.02 \times 56.11 \times p\}/A$$

The polyester resin of the present invention preferably has a gel fraction of 0% to 10% by mass and more preferably 0% to 4% by mass from the viewpoint of solvent solubility of the resin and appearance of the coating film.

The gel fraction is determined as follows, 0.5 g of a polyester resin is precisely weighed in a 100 mL Erlenmeyer flask (A (g)) to which 50 mL of tetrahydrofuran (THF) is then added, and the flask is immersed in a water bath set at 70° C. for 3 hours to dissolve the resin. On the other hand, a glass filter 1GP100 is tightly filled with Celite 545 for 6 to 7 minutes, dried in a vacuum dryer at 105° C. for 3 hours or more, and weighed (B (g)). Subsequently, the THF solution in which the polyester resin is dissolved is transferred into the dried glass filter to carry out suction filtration. All the contents remaining on the wall of the Erlenmeyer flask are transferred into the glass filter using acetone, and the soluble contents in the glass filter are dropped into a suction bottle while pouring acetone in the glass filter which is then continuously sucked such that no solvent remains in the filter. Thereafter, the glass filter is dried in a vacuum dryer at 80° C. for 1 hour or more and weighed (C (g)), and the gel fraction is calculated according to the following equation.

$$\text{Gel fraction (\% by mass)} = (C-B)/A \times 100$$

The polyester resin of the present invention preferably has a weight average molecular weight (Mw) of 10000 or more and more preferably 20000 or more. In a case where the Mw of the polyester resin is within the above range, the durability and fixability after adhesion to a substrate are further improved.

The Mw of the polyester resin can be measured using gel permeation chromatography (GPC). For example, the Mw of the polyester resin can be determined as a molecular weight in terms of polystyrene using a solvent such as THF as an eluent.

The polyester resin according to the first aspect of the present invention preferably has a color b value of 5 or less, as measured by spectrophotometric colorimetry. The color b value is preferably 0 or more and 5 or less and more preferably 0 or more and 2 or less from the viewpoint of transparency of the coating film in a case of being applied onto a substrate.

[Method for Producing Polyester Resin]

The method for producing a polyester resin according to the present invention is a method of polymerizing a monomer mixture containing the carboxylic acid having a cyclic structure and containing 5 or more carboxyl groups and the polyhydric alcohol as described above in the presence of a polyester polymerization catalyst. Specifically, a known method can be adopted in which the monomer mixture is subjected to an esterification reaction or a transesterification reaction in the presence of a polyester polymerization catalyst and then subjected to a polycondensation reaction.

The esterification reaction or transesterification reaction is carried out until no water is distilled off from the reaction system. Thereafter, a polycondensation reaction is subsequently carried out. At this time, the polycondensation reaction is carried out while gradually decompressing the inside of a reaction apparatus and distilling off and removing the volatile monomer component under a vacuum of preferably 150 mmHg (20 kPa) or less and more preferably 15 mmHg (2 kPa) or less. The polycondensation reaction is carried out until the torque of a stirring blade reaches a value indicating a desired softening temperature, and then the reaction is terminated.

The termination of a reaction means that stirring of a polymerization apparatus is stopped and the inside of the polymerization apparatus is brought to normal pressure; thereafter, the inside of the polymerization apparatus is pressurized with an inert gas such as nitrogen, and a reactant (polyester resin) is taken out from the lower part of the polymerization apparatus and cooled down to a temperature of 100° C. or lower.

The polyester resin of the present invention can also be produced by using a monomer mixture containing a carboxylic acid having a cyclic structure and containing 5 or more carboxyl groups, a dicarboxylic acid, and a polyhydric alcohol as the monomer mixture, according to the method for producing a polyester resin according to the present invention. In particular, the polyester resin of the first aspect of the present invention can be produced by setting the amount of the carboxylic acid having a cyclic structure and containing 5 or more carboxyl groups to 0.01 parts by mole or more and 45 parts by mole or less in a case where the dicarboxylic acid is 100 parts by mole in the monomer mixture.

The reaction temperature is preferably in a range of 180° C. to 280° C. In a case where the reaction temperature is 180° C. or higher, the productivity tends to become favorable. In a case where the reaction temperature is 280° C. or lower, there is a tendency that it is possible to suppress the decomposition of the polyester resin or the production of a volatile component that causes odor. The lower limit value of the reaction temperature is more preferably 200° C. or higher, and the upper limit value of the reaction temperature is more preferably 270° C. or lower.

For example, a polymerization catalyst such as titanium tetraalkoxide, titanium oxide, dibutyltin oxide, tin oxide, tin acetate, zinc acetate, tin disulfide, antimony trioxide, germanium dioxide, or magnesium acetate can be used in the polymerization of the polyester resin. The following polymerization catalyst A is preferable from the viewpoint of excellent reactivity and great color tone of the obtained polyester, and the following polymerization catalyst A is used in the method for producing a polyester resin according to the present invention.

[Polymerization Catalyst A]

The polymerization catalyst A used for the polymerization of polyester contains a titanium atom, an alkaline earth metal atom, a phosphorus atom, and carbon atoms, in which at least a part of the carbon atoms is derived from at least one selected from an organic acid and a carboxylate. Preferably, in the polymerization catalyst A (100% by mass), it is preferable that a content T (mass basis) of titanium atoms is 4% to 20% by mass, and the following expressions (1), (2), and (3) are satisfied.

$$0.8 \leq L/M (\text{molar ratio}) \leq 1.8 \quad (1)$$

$$0.05 \leq T/C (\text{mass ratio}) \leq 0.50 \quad (2)$$

$$0.5 \leq M/P (\text{molar ratio}) \leq 3.0 \quad (3)$$

(In the expressions, L indicates a content (molar basis) of at least one compound selected from an organic acid and a carboxylate, M indicates a content (molar basis) of alkaline earth metal atoms, T indicates a content (mass basis) of titanium atoms, C indicates a content (mass basis) of carbon atoms, and P indicates a content (molar basis) of phosphorus atoms.)

Examples of the at least one compound selected from an organic acid and a carboxylate constituting at least a part of carbon atoms contained in the polymerization catalyst A include an aliphatic carboxylic acid and an aliphatic carboxylate. Above all, an aliphatic carboxylic acid having 1 to 4 carbon atoms or an aliphatic carboxylate having 1 to 4 carbon atoms is preferable. In particular, in a case where a dihydric alcohol such as ethylene glycol or 1,4-butanediol is used as a raw material for a polyester resin, acetic acid ($CH_3COOH$) or acetate ion ($CH_3COO^-$) is particularly preferable from the viewpoint of excellent solubility of the catalyst in the dihydric alcohol.

In a case where the content T (mass basis) of titanium atoms in the polymerization catalyst A is the above lower limit or more, a polycondensation reaction rate during the polycondensation reaction does not decrease, and an industrially sufficient polycondensation reaction rate can be obtained. In a case where the content T (mass basis) of titanium atoms in the polymerization catalyst A is the above upper limit or less, the color tone and thermal stability of the obtained polyester resin are unlikely to decrease while a sufficient polycondensation reaction rate can be obtained.

The content T of titanium atoms in the polymerization catalyst A is preferably 4.5% by mass or more and more preferably 5.5% by mass or more and is preferably 16% by mass or less and more preferably 14% by mass or less. For example, the content T of titanium atoms in the polymerization catalyst A is preferably 4.5% to 16% by mass and more preferably 5.5% to 14% by mass.

In Expression (1), in a case where the L/M is the above upper limit value or less, the catalytic activity is unlikely to decrease. In a case where the L/M is the above lower limit value or more, sufficient solubility of the catalyst in dihydric alcohols is obtained. The upper limit of L/M is preferably 1.7 and more preferably 1.6, and the lower limit of L/M is preferably 0.8 and more preferably 1.0. For example, $0.8 \leq L/M$ (molar ratio) $\leq 1.7$ is preferable, and $1.0 \leq L/M$ (molar ratio) $\leq 1.6$ is more preferable.

In Expression (2), the upper limit of T/C is preferably 0.40 and more preferably 0.30 and the lower limit of T/C is preferably 0.15 and more preferably 0.20 from the viewpoint of solubility of the catalyst in the dihydric alcohol. For example, $0.15 \leq T/C$ (mass ratio) $\leq 0.40$ is preferable, and $0.20 \leq T/C$ (mass ratio) $\leq 0.30$ is more preferable.

In Expression (3), the upper limit of M/P is preferably 1.8 and more preferably 1.5 and the lower limit of M/P is preferably 0.9 and more preferably 1.1 from the viewpoint of thermal stability of the polyester resin obtained by using this catalyst and stability of the catalyst in the dihydric alcohol. For example, $0.9 \leq M/P$ (molar ratio) $\leq 1.8$ is preferable, and $1.1 \leq M/P$ (molar ratio) $\leq 1.5$ is more preferable.

[Method for Producing Polymerization Catalyst A]

The polymerization catalyst A can be produced by mixing and concentrating an alcohol, a titanium compound, an alkaline earth metal compound, and an acidic phosphate compound. More specifically, the polymerization catalyst A is produced by (i) a step of mixing, dissolving, and reacting an alcohol, a titanium compound, an alkaline earth metal compound, and an acidic phosphate compound, and (ii) a step of distilling off an alcohol or the like from a reaction solution obtained in step (i) to carry out further a reaction at the same time as concentration.

The alcohol used in the production of the polymerization catalyst A may be any alcohol that mixes a titanium compound, an alkaline earth metal compound, and an acidic phosphate compound to form a uniform solution, among which a monohydric alcohol such as methanol, ethanol, butanol, propanol, or 2-ethylhexanol is preferably used from the viewpoint of solubility of the compound and ease of handling. These alcohols may be used alone or in combination of two or more thereof.

In particular, ethanol is preferable from the viewpoint of high solubility of titanium compounds, alkaline earth metal compounds, and acidic phosphate compounds, and low boiling point and therefore easy removal in a case where the reaction solution is concentrated.

Examples of the titanium compound include tetraalkoxy titanate such as tetra-n-propyl titanate, tetra-i-propyl titanate, tetra-n-butyl titanate, tetra-n-butyl titanate tetramer, tetra-t-butyl titanate, or acetyl-tri-i-propyl titanate; and titanium acetate, among which tetra-i-propyl titanate or tetra-n-butyl titanate is preferable, and tetra-n-butyl titanate is particularly preferable. These titanium compounds may be used alone or in combination of two or more thereof.

An organic acid salt of an alkaline earth metal or a hydrate thereof is preferably used as the alkaline earth metal compound. Above all, preferred compounds include an organic acid salt of magnesium, calcium, or the like or a hydrate thereof, but a magnesium compound is preferable from the viewpoint of catalytic activity. Examples of the magnesium compound include organic acid salts such as magnesium acetate and magnesium butyrate, among which magnesium acetate or a hydrate thereof is particularly preferable from the viewpoint of high solubility in alcohol and easy catalyst preparation. These alkaline earth metal compounds may be used alone or in combination of two or more thereof. In a case where two or more alkaline earth metal compounds are used in combination, compounds of different metals such as magnesium compound and calcium compound can be used in combination.

A compound having an ester structure of phosphoric acid containing at least one hydroxyl group represented by General Formula (I) or (II) is preferably used as the acidic phosphate compound.

(In the formulae, R, R', and R" each represent an alkyl group having 1 or more and 6 or less carbon atoms, a cyclohexyl group, an aryl group, or a 2-hydroxyethyl group, and in Formula (I), R and R' may be the same or different from each other.)

Specific examples of such an acidic phosphate compound include methyl acid phosphate, ethyl acid phosphate, isopropyl acid phosphate, butyl acid phosphate, and octyl acid phosphate, among which ethyl acid phosphate or butyl acid phosphate is preferable. These acidic phosphate compounds may be used alone or in combination of two or more thereof.

The acidic phosphate compound includes a monoester compound (II) and a diester compound (1). As the acidic phosphate compound, it is preferable to use a monoester compound, or it is preferable to use a mixture of a monoester compound and a diester compound, containing 30% by mass or more, preferably 40% by mass or more of the monoester compound in a total amount of 100% by mass of the monoester compound and the diester compound. A monoethyl ester compound or a monobutyl ester compound is preferably used as the monoester compound or the monoester compound in the mixture of the monoester compound and the diester compound.

In addition, 5% to 20% by mass of orthophosphoric acid as an impurity may be contained in 100% by mass of the acidic phosphate compound, in addition to the monoester compound (IT) and the diester compound (I).

[Applications]

The polyester resin of the present invention can be used for applications such as a coating agent, an adhesive, a binder for ink, a binder for toner, and a film.

In addition, the polyester resin of the present invention can be used by being kneaded with an epoxy resin, a urethane resin, an acrylic resin, a polyethylene resin, a polypropylene resin, or the like in order to improve the viscosity, elasticity, thermal properties, and the like of the polyester resin.

[Coating Agent]

The coating agent of the present invention contains the polyester resin of the present invention. The coating agent of the present invention may be composed of the polyester resin of the present invention alone, or may contain other components if necessary. The coating agent of the present invention is capable of forming a cured film on a substrate by applying the coating agent onto a substrate such as a molded product or film of a metal, a resin or the like and curing the applied coating agent. The formed cured film has scratch resistance and chemical resistance, and is therefore useful as a top coat for resin molded products and resin films.

[Adhesive]

The adhesive of the present invention contains the polyester resin of the present invention. The adhesive of the present invention may be composed of the polyester resin of the present invention alone, or may contain other components if necessary. For example, a filler can be added to impart heat resistance, thermal conductivity, flame retardancy, electrical conductivity, and the like. Examples of the filler include inorganic fillers such as metal powder (such as zinc oxide powder or titanium oxide powder), carbon black (such as acetylene black), talc, glass powder, silica powder, and conductive particles; and organic fillers such as polyethylene powder, polyester powder, polyamide powder, fluororesin powder, polyvinyl chloride powder, epoxy resin powder, and silicone resin powder. These fillers may be used alone or in combination of two or more thereof. The adhesive of the present invention has excellent adhesiveness to various substrates.

[Binder for Toner]

The polyester resin of the present invention can be used alone or in combination with another binder resin for toner as a binder resin for toner.

Examples of the binder resin for toner other than the polyester resin of the present invention include a polyester resin, a styrene resin, a styrene-acrylic resin, a polyolefin resin, an ethylene-acrylic resin, an olefin-acrylic resin, a polyethylene resin, a polypropylene resin, and an epoxy resin. These binder resins may be used alone or in combination of two or more thereof. The binder for toner containing the polyester resin of the present invention has excellent adhesiveness to various substrates.

[Ink]

The resin composition of the present invention contains a polyester resin containing a constitutional unit A derived from a carboxylic acid having a cyclic structure and containing 5 or more carboxyl groups and a constitutional unit derived from a dicarboxylic acid and a pigment.

A pigment that is usually used or can be used in the art can be used as the pigment contained in the resin composition of the present invention.

The ink of the present invention contains the resin composition of the present invention.

With regard to the ink of the present invention, the resin composition of the present invention may be dissolved in a solvent, if necessary. Any solvent that can dilute the polyester resin contained in the resin composition of the present invention can be used as the solvent without any limitation.

The polyester resin contained in the resin composition of the present invention and the ink of the present invention may be the polyester resin of the present invention.

Examples of the solvent in the ink of the present invention include various solvents including an aromatic hydrocarbon solvent such as toluene or xylene; an aliphatic hydrocarbon solvent such as hexane, octane, or decane; an ester solvent such as methyl acetate, ethyl acetate, isopropyl acetate, butyl acetate, amyl acetate, ethyl formate, butyl propionate, or dibasic acid ester DBE (product name of Sigma-Aldrich Japan LLC); an alcohol solvent such as methanol, ethanol, propanol, butanol, 2-ethylhexanol, or ethylene glycol; a ketone solvent such as acetone, methyl ethyl ketone, methyl isobutyl ketone, cyclohexanone, or isophorone; an ether solvent such as dioxane, diethyl ether, or THF; a cellosolve solvent such as cellosolve acetate, ethyl cellosolve, butyl cellosolve, or butyl carbitol; and a mixed solvent: dibasic acid ester DBE (product name of Sigma-Aldrich Japan LLC)/Solvent #100/Solvent #150 (product name of Sankyo Chemical Co., Ltd.)=38/6/56 (mass ratio).

The concentration of the polyester resin in a case of being diluted with a solvent in the ink of the present invention is preferably 20% to 70% by mass and more preferably 30% to 60% by mass.

EXAMPLES

Hereinafter, the present invention will be described in more detail with reference to Examples. In addition, the evaluation was carried out by the following method.

<Measurement of Glass Transition Temperature (Tg)>

The glass transition temperature of the polyester resin was measured from the intersection of a baseline of a chart and a tangent line of an endothermic curve at a temperature rise rate of 5° C./min using a differential scanning calorimeter ("DSC-60" manufactured by Shimadzu Corporation) in accordance with JIS K7121-1987. A sample in which 10 mg f 0.5 mg was weighed in an aluminum pan, melted at 100° C. for 10 minutes, and then rapidly cooled with dry ice was used as a measurement sample.

<Measurement of Softening Temperature (T4)>

The softening temperature of the polyester resin was measured in such a manner that 1.0 g of a resin sample was extruded using a flow tester ("CFT-500D", manufactured by Shimadzu Corporation) under a nozzle of 1 mmφ×10 mm, a load of 294 N, and a constant temperature rise rate of 3° C./min, and a temperature at which 4 mm of the sample flowed out from the nozzle was measured and defined as the softening temperature of the polyester resin.

<Measurement of Acid Value (AV)>

The acid value of the polyester resin was measured as follows. Approximately 0.2 g of a measurement sample was weighed in a branched Erlenmeyer flask (A (g)) to which 10 ml of benzyl alcohol was then added, followed by heating in a heater at 230° C. for 15 minutes under a nitrogen atmosphere to dissolve the measurement sample. After allowing to cool to room temperature, 10 ml of benzyl alcohol, 20 ml of chloroform, and a few drops of a phenolphthalein solution were added thereto, followed by titration with a 0.02N KOH solution (titration amount=B (ml), titer of KOH solution=p). The blank measurement was carried out in the same manner (titration amount=C (ml)), and the acid value was calculated according to the following expression.

Acid value (mgKOH/g)={$(B-C) \times 0.02 \times 56.11 \times p$}/$A$

<Measurement of Hydroxyl Value (OHV)>

Approximately 5.0 g of a polyester resin was precisely weighed in an Erlenmeyer flask (A (g)) to which 50 mL of THF was then added to completely dissolve the resin, 30 mL of a dimethylaminopyridine/THF solution was added, and 10 mL of an acetic anhydride/THF solution was added, followed by stirring for 15 minutes. Further, 3 ml, of distilled water was added, followed by stirring for 15 minutes, and 50 mL of THF and 25 mL of a 0.5N KOH solution were added. A few drops of a phenolphthalein solution were added as an indicator, followed by titration with a 0.5N KOH solution (titration amount=B (mL), titer of KOH solution=f). The blank measurement was carried out in the same manner (titration amount=C (mL)), and the hydroxyl value was calculated according to the following expression.

Hydroxyl value (mgKOH/g)= $(C-B) \times 56.11 \times f/A$ +acid value

<Measurement of Gel Fraction (THF-Insoluble Content)>

0.5 g of a polyester resin was precisely weighed in a 100 mL Erlenmeyer flask (A (g)) to which 50 mL of THF was then added, and the flask was immersed in a water bath set at 70° C. for 3 hours to dissolve the resin. On the other hand, a glass filter 1GP100 was tightly filled up to 60% to 70% with Celite 545, dried in a vacuum dryer at 105° C. for 3 hours or more, and weighed (B (g)). Subsequently, the THF solution in which the polyester resin was dissolved was transferred into the dried glass filter to carry out suction filtration. All the contents remaining on the wall of the Erlenmeyer flask were transferred into the glass filter using acetone, and the soluble contents in the glass filter were dropped into a suction bottle while pouring acetone in the glass filter which was then continuously sucked such that no solvent remained in the filter. Thereafter, the glass filter was dried in a vacuum dryer at 80° C. for 1 hour or more and weighed (C (g)), and the gel fraction was calculated according to the following equation.

Gel fraction (% by mass)=$(C-B)/A \times 100$

<Measurement of Molecular Weight (Weight Average Molecular Weight (Mw), Peak Molecular Weight (Mp), and Number Average Molecular Weight (Mn))>

The weight average molecular weight (Mw), peak molecular weight (Mp), and number average molecular weight (Mn) were determined in terms of standard polystyrene by GPC, from the retention time corresponding to a peak value of an elution curve obtained. The peak value of the elution curve is a point where the elution curve shows a maximum value and in a case where there are two or more greatest values, the peak value of the elution curve is a point where the elution curve gives the greatest value.

Apparatus: HLC-8020, manufactured by Tosoh Corporation

Column: TSKgelGMHXL (column size: 7.8 mm (ID)× 30.0 cm (L)), three columns connected in series, manufactured by Tosoh Corporation Oven temperature: 40° C.

Eluent: THF

Sample concentration: 4 mg/10 mL.

Filtration conditions: The sample solution was filtered through a 0.45 μm Teflon (registered trademark) membrane filter Flow rate: 1 mL/min Injection volume: 0.1 mL.

Detector: RI

Standard polystyrene sample for drawing a calibration curve: TSK standard A-500 (molecular weight: $5.0 \times 10^2$), A-2500 (molecular weight: $2.74 \times 10^3$), F-2 (molecular weight: $1.96 \times 10^4$), F-20 (molecular weight: $1.9 \times 10^5$), F-40 (molecular weight: $3.55 \times 10^5$), F-80 (molecular weight: $7.06 \times 10^5$), F-128 (molecular weight: 1.09×10⁶), F-288 (molecular weight: 2.89× 10⁶), F-700 (molecular weight: 6.77×10⁶), and F-2000 (molecular weight: 2.0×10⁷), all manufactured by Toyo Soda Manufacturing Co., Ltd.

<Colorability: Color Lab Value>

The color Lab value was determined as follows: A polyester resin was filled in a mini petri dish CM-A157 (manufactured by Konica Minolta, Inc.). Using a spectrophotometric colorimeter CM-5 (manufactured by Konica Minolta, Inc.) equipped with a target mask CM-A158 (manufactured by Konica Minolta, Inc.) for the mini petri dish, the color Lab value based on the color coordinates of the Hunter's color difference equation in the Lab display system described in JIS Z8730 was obtained as a simple arithmetic average value of the values measured at four points by rotating the measurement petri dish by 90 degrees by a petri dish method.

<Grindability>

Approximately 2.0 g of a polyester resin sieved to a particle size of 710 μm to 1 mm using a JIS standard sample splitter was placed in a TRIO BLENDER (manufactured by Trio Science Co., Ltd.) and ground at a rotation speed of 5 (maximum speed setting) for 30 seconds. The JIS standard sample splitter was installed in an electromagnetic micro vibro sifter (manufactured by Tsutsui Scientific Instruments Co., Ltd.), and the ground polyester resin was placed in the splitter and then vibrated at a strength of 10 for 30 seconds. The polyester resin having a size of 500 μm remaining on the splitter was weighed. The grindability was evaluated from the obtained resin residual ratio as follows.

A (extremely good): The resin residual ratio is less than 70% by mass

B (good): The resin residual ratio is 70% by mass to 79% by mass

C (inferior): The resin residual ratio is 80% by mass to 89% by mass

D (very inferior): The resin residual ratio is 90% by mass or more

<Followability of Resin Coating Film>

The followability of resin coating film was evaluated from a degree of peeling of a resin coating film from a substrate in a case where an untreated PET film, on which the resin coating film had been formed, was folded in half, rubbed 10 times with a 1.2 kg roller from above to make sufficient creases, and then unfolded.

A (good): The resin coating film does not peel off from the substrate at all.

B (inferior): The resin coating film peels off from the substrate by 10% or more as an area percentage of the resin coating film.

<Adhesiveness of Resin Coating Film>

The adhesiveness of resin coating film was evaluated from a degree of peeling of a resin coating film from a substrate in a case where SELLOTAPE (registered trademark) was attached on the resin coating film, leaving the ends thereof, and rubbed 10 times with a 1.2 kg roller from above to be sufficiently adhered, and the ends of SELLOTAPE (registered trademark) were made perpendicular to the substrate and then the SELLOTAPE was momentarily peeled off. An untreated PET film (COSMOSHINE A4100, thickness: 125 μm, manufactured by Toyobo Co., Ltd.), a glass plate, and a copper plate (CCL-HL832, thickness: 0.4 mm, manufactured by Mitsubishi Gas Chemical Company) were used as the substrate.

A (good): The resin coating film does not peel off from the substrate at all.

B (inferior): The resin coating film peels off from the substrate by 10% or more as an area percentage of the resin coating film.

[Method for Preparing Polyester Polymerization Catalyst]

116.6 g of magnesium acetate tetrahydrate was placed in a 500 mL glass eggplant-shaped flask equipped with a stirrer, and 250 g of absolute ethanol (purity: 99% by mass or more) was further added thereto. Further, 71.6 g of ethyl acid phosphate (mixed mass ratio of monoester compound to diester compound=1:1.22) was added thereto, followed by stirring at 23° C. After confirming that magnesium acetate was completely dissolved after 20 minutes, 75.0 g of tetra-n-butyl titanate was added. Stirring was continued for another 10 minutes to obtain a homogeneous mixed solution. This mixed solution was transferred to a 1 L eggplant-shaped flask and concentrated under reduced pressure by an evaporator in an oil bath at 60° C. After about 2 hours, most of the ethanol was distilled off, leaving a translucent, viscous liquid. Next, 205.5 g of ethylene glycol was added such that the content was 422 g, and a low boiling point substance was further distilled off at 80° C. and a relative pressure of 0.050 kPaG over 2 hours to obtain a polymerization catalyst A.

Examples 1 to 6 and Comparative Examples 1 to 4

[Method for Producing Polyester Resin]

A polyvalent carboxylic acid (unit: parts by mole), a polyhydric alcohol (unit: parts by mole), and catalyst A (120 ppm; Ti: 4 ppm, Mg: 5 ppm, P: 6 ppm) having the charged compositions shown in Table 1 were charged into a reaction vessel equipped with a distillation column. Then, the temperature was started to rise, the temperature inside a reaction system was heated to 265° C., this temperature was maintained, and an esterification reaction was carried out until no water was distilled off from the reaction system. Next, while maintaining the temperature inside the reaction system at 265° C., the inside of the reaction vessel was decompressed to 0.5 kPa·abs and stirred at 200 rpm to carry out a polycondensation reaction while distilling off the polyhydric alcohol from the reaction system. At a polymerization end point, in a case where the polycondensation reaction time shown in Table 1 had elapsed, the stirring of the reaction apparatus was stopped, the inside of the apparatus was set to normal pressure, the inside of the apparatus was pressurized with nitrogen, and the reactant was taken out from the lower part of the apparatus and cooled to 100° C. or lower to obtain a polyester resin. The characteristic values of the obtained resin are shown in Table 2.

The abbreviations in Table 1 have the following meanings.

TPA: terephthalic acid
IPA: isophthalic acid
EG: ethylene glycol
NPG: neopentyl glycol
CHHA: cyclohexanehexacarboxylic acid
MLA: mellitic acid
BPA: benzene pentacarboxylic acid
TMA: trimellitic acid
BPDA: biphenyltetracarboxylic acid
INO: inositol
N. A.: non-polymerizable due to gelation

[Preparation of Resin Coating Film]

The obtained polyester resin and MEK were weighed in a glass container so as to have a solid content of 30% by mass, and were completely dissolved with a magnetic stirrer. The prepared resin solution was coated on a substrate using a bar coater (No. 20) and the coated substrate was allowed to stand at 25° C. for 30 minutes to form a resin coating film having a thickness of about 8 μm on the substrate. An untreated PET film (COSMOSHINE A4100, thickness: 125 μm, manufactured by Toyobo Co., Ltd.) and a glass plate (thread chamfered product, thickness: 2.0 mm, manufactured by Ohshima-Garasu Co., Ltd.) were used as the substrate.

The characteristic values of the obtained resin coating film are shown in Table 2.

TABLE 1

|  | Example | | | | | | Comparative Example | | | |
| --- | --- | --- | --- | --- | --- | --- | --- | --- | --- | --- |
|  | 1 | 2 | 3 | 4 | 5 | 6 | 1 | 2 | 3 | 4 |
| TPA | 47 | 47 | 47 | 47 | 47 | 47 | 47 | 47 | 47 | 47 |
| IPA | 53 | 53 | 53 | 53 | 53 | 53 | 53 | 53 | 53 | 53 |
| EG | 75 | 75 | 75 | 75 | 75 | 75 | 75 | 75 | 75 | 75 |
| NPG | 60 | 60 | 60 | 60 | 60 | 60 | 60 | 60 | 60 | 60 |
| CHHA | 0.10 | 0 | 0 | 0 | 0 | 0 | 0 | 0 | 0 | 0 |
| MLA | 0 | 0.10 | 0.28 | 1.32 | 0.00 | 0.03 | 0 | 0 | 0 | 50 |
| BPA | 0 | 0 | 0 | 0 | 0.12 | 0 | 0 | 0 | 0 | 0 |
| TMA | 0 | 0 | 0 | 0 | 0 | 0.14 | 0 | 0 | 0 | 0 |
| BPDA | 0 | 0 | 0 | 0 | 0 | 0 | 0 | 0.16 | 0 | 0 |
| INO | 0 | 0 | 0 | 0 | 0 | 0 | 0 | 0 | 0.10 | 0 |
| Polycondensation reaction time (min) | 146 | 108 | 91 | 20 | 101 | 190 | 180 | 139 | 180 | N.A. |

TABLE 2

|  |  | Example | | | | | | Comparative Example | | | |
| --- | --- | --- | --- | --- | --- | --- | --- | --- | --- | --- | --- |
|  |  | 1 | 2 | 3 | 4 | 5 | 6 | 1 | 2 | 3 | 4 |
| Tg (° C.) | | 62 | 63 | 62 | 56 | 63 | 61 | 63 | 63 | 62 | — |
| T4 (° C.) | | 154 | 154 | 152 | 139 | 153 | 146 | 153 | 154 | 152 | — |
| AV (mgKOH/g) | | 0.6 | 0.5 | 0.4 | 0.8 | 0.6 | 0.6 | 0.2 | 0.5 | 0.6 | — |
| OHV (mgKOH/g) | | 7 | 8 | 9 | 27 | 9 | 6 | 6 | 7 | 6 | — |
| Gel fraction (% by mass) | | 2 | 2 | 1 | 5 | 3 | 2 | 1 | 6 | 2 | — |
| Mw | | 35200 | 36100 | 42900 | 93100 | 34300 | 23100 | 26900 | 32800 | 27800 | — |
| Mp | | 28000 | 28700 | 22100 | 5400 | 27500 | 25800 | 31500 | 30200 | 29200 | — |
| Mn | | 3900 | 4000 | 2600 | 2200 | 3000 | 2600 | 3500 | 4000 | 3700 | — |
| Spectrophotometric colorimetry | L | 60 | 61 | 65 | 61 | 59 | 61 | 61 | 60 | 57 | — |
|  | a | −1 | 0 | 0 | 0 | 0 | 0 | −1 | 0 | −1 | — |
|  | b | 2 | 0 | 0 | 0 | 0 | 0 | 1 | 0 | 6 | — |
| Resin residual ratio (% by mass) | | 75 | 78 | 66 | 17 | 78 | 58 | 93 | 81 | 81 | — |
| Grindability | | B | B | A | A | B | A | D | C | C | — |
| PET | Followability | A | A | A | A | A | A | A | A | A | — |
|  | Adhesiveness | A | A |  | A | A | A | A | A | A | — |
| Glass | Adhesiveness | A | A | A | A | A | A | A | A | A | — |

Based on the results shown in Tables 1 and 2, Comparative Examples 1 to 3 containing no constitutional unit derived from a carboxylic acid having a cyclic structure and containing 5 or more carboxyl groups were inferior in grindability from the results shown in Table 2.

In Comparative Example 4, since the amount of the constitutional unit derived from a carboxylic acid having a cyclic structure and containing 5 or more carboxyl groups was large, a large amount of gel, which is a solvent-insoluble component, was generated during the reaction, and thus polymerization was impossible.

The invention claimed is:
1. A polyester resin comprising:
a constitutional unit A derived from a carboxylic acid having a cyclic structure and containing 5 or more carboxyl groups;
a constitutional unit derived from a dicarboxylic acid; and
a constitutional unit derived from a polyhydric alcohol,
wherein
the constitutional unit A has a content of 0.01 parts by mole or more and 5 parts by mole or less with respect to 100 parts by mole of the constitutional unit derived from a dicarboxylic acid,
the carboxylic acid having a cyclic structure and containing 5 or more carboxyl groups is at least one selected from the group consisting of benzenepentacarboxylic acid, cyclohexanehexacarboxylic acid and mellitic acid,
the acid value of the polyester resin is 0.1 mgKOH/a or more and 0.8 mgKOH/a or less, and
the hydroxyl value of the polyester resin is 6 mgKOH/g or more and 27 mgKOH/g or less.
2. The polyester resin according to claim 1, wherein the polyester resin has a weight average molecular weight (Mw) of 10000 or more, as measured by GPC.
3. The polyester resin according to claim 1, wherein the polyester resin has a color b value of 2 or less, as measured by spectrophotometric colorimetry.
4. The polyester resin according to claim 1,
wherein the polyester resin has a color b value of 2 or less, as measured by spectrophotometric colorimetry.
5. A coating agent comprising:
the polyester resin according to claim 1.

6. An adhesive comprising:
the polyester resin according to claim 1.

7. A resin composition comprising:
a polyester resin according to claim 1; and
a pigment.

8. An ink comprising:
the resin composition according to claim 7.

9. The polyester resin according to claim 1, wherein the polyester resin has a color b value of 2 or less, and a color L value of 59 to 65, as measured by spectrophotometric colorimetry.

* * * * *